(No Model.)
C. RACH.
APPARATUS FOR THE PREPARATION OF WORT.
No. 469,718. Patented Mar. 1, 1892.
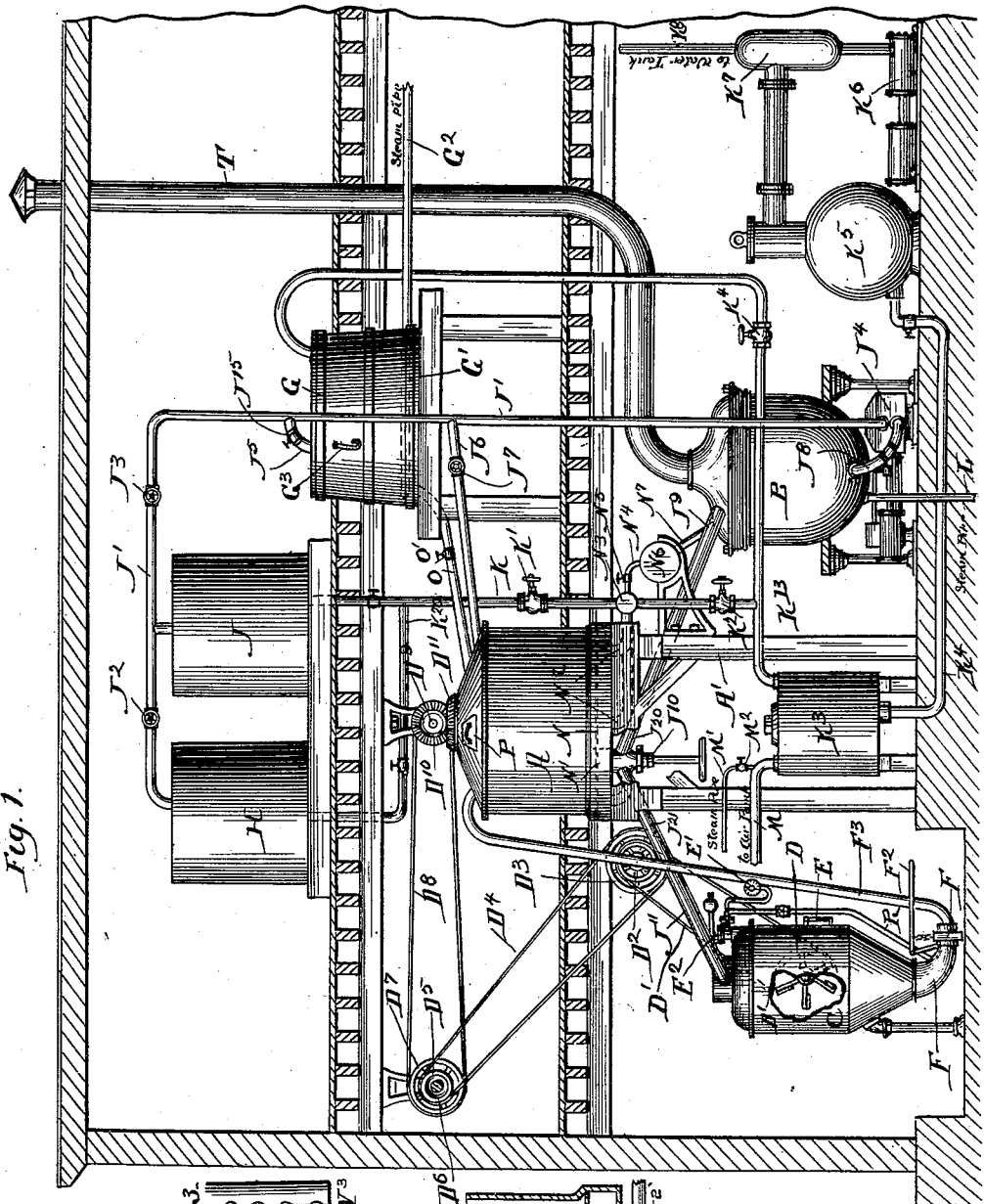
Fig. 1.
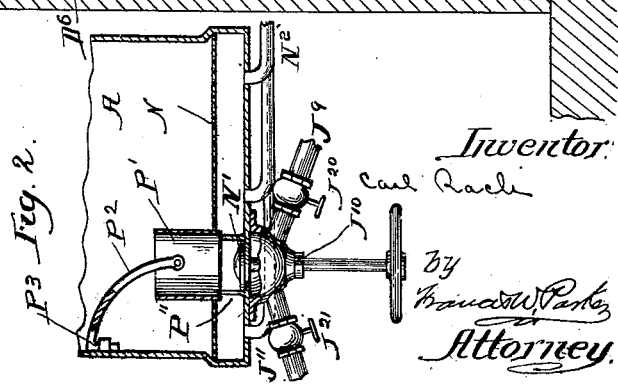
Fig. 2.
Fig. 3.
Witnesses:
Inventor
Carl Rach
by Frank W. Parker
Attorney.

UNITED STATES PATENT OFFICE.

CARL RACH, OF CHICAGO, ILLINOIS.

APPARATUS FOR THE PREPARATION OF WORT.

SPECIFICATION forming part of Letters Patent No. 469,718, dated March 1, 1892.

Application filed January 8, 1891. Serial No. 377,167. (No model.)

*To all whom it may concern:*

Be it known that I, CARL RACH, a subject of the King of Prussia, residing at Chicago, in the county of Cook and State of Illinois, have invented a certain new and useful Improvement in Apparatus for the Preparation of Wort, of which the following is a full, clear, and exact specification.

My invention relates to devices for the preparation of wort from malt or natural cereals, or both, and has for its object to provide means whereby the manufacture of such wort is facilitated. It is illustrated in the accompanying drawings, wherein—

Figure 1 is a general view. Fig. 2 is a detail of the mash-tun. Fig. 3 is a detail plan view of the header $N^3$.

A is a mash-tun on an elevated support $A'$ $A'$.

B is a steam-jacketed kettle.

C is a cooker. The cooker is provided with a stirrer driven from the wheel D by the belt $D'$, which is driven by the pulley $D^2$, associated with the pulley $D^3$, the driving-belt of which $D^4$ is driven from the pulley $D^5$ on the counter-shaft $D^6$. Another pulley $D^7$ on this shaft drives the belt $D^8$, which rotates the shaft $D^9$, thus operating the gear $D^{10}$ to drive the meshing-gear $D^{11}$, and thus operate the stirrer in the mash-tun A.

E is a thermometer to indicate the temperature of the contents of the cooker C.

$E'$ is a pressure-gage connected with the cooker, and $E^2$ is a safety-valve, preferably set at sixty pounds.

F is a portion of the cooker provided with the sliding valve $F'$, controlled by the handle $F^2$, and controlling the connection between the cooker and the pipe $F^3$, which leads to the mash-tun A.

G is a tun elevated above the tun A and provided with a coil $G'$, supplied with a fluid-pipe $G^2$.

$G^3$ is a thermometer.

H is a cold-water tank, and J is the hot-water tank, and a pipe $J'$, controlled by the valves $J^2$ $J^3$, leads from the two tanks, as indicated, to a pump $J^4$. This pipe is connected by the pipe $J^5$ with the tun G and by the pipe $J^6$ with the tun A, this latter pipe being controlled by the valve $J^7$.

The steam-jacketed heater is connected to steam-pump $J^4$ by the pipe $J^8$.

$J^9$ is a pipe leading from below the tun A to the heater B, and is controlled by the valves $J^{10}$ $J^{20}$, and a similar pipe $J^{11}$, in like manner controlled by the valves $J^{10}$ $J^{21}$, (shown in Fig. 2, but indicated only by the letters in Fig. 1, since in the latter case the scale is too small to permit the illustration of the valves,) leads from the tun A to the cooker C. From the tank J leads the pipe K, having the valves $K'$ and $K^2$ to the pipe $K^{13}$, which leads into the tank $K^3$. From this tank leads the pipe $K^4$ to the vacuum-pan $K^5$, operated by the pump $K^6$ and connected with the condenser $K^7$, whence leads the water-pipe $K^8$. The pipe $K^{13}$ contains the valve $K^{14}$ and leads into the tun G.

L is the steam-pipe, which supplies the steam to the heater B. The tank $K^3$ is also connected with an air-pump by the pipe M, whereby it may be exhausted, and with a steam-supply by the pipe $M'$, having the valve $M^2$ therein.

N is a false or perforated bottom in the tun A, and the upper portion of the stem of the valve $J^{10}$ connects with the plate $N'$, which moves in the tun A below such false bottom to close or open connection between the tun A and the pipes $J^9$ or $J^{11}$. $N^2$ are pipes opening from below such false bottom and leading to the header $N^3$, connected with the pipe K. From this header leads the pipe $N^4$, having the valve $N^5$ and opens into the drum $N^6$, whence leads the pipe $N^7$ to the heater B.

$J^{15}$ is a valve in the pipe $J^5$.

O is a pipe leading from the tun G to the tun A and controlled by the valve $O'$.

P is a door in the top of the tun A, and $P'$ a small cylinder attached to the hook $P^2$, which is itself adapted to be secured at the point $P^3$ to the inside of the tun A. The hook is bifurcated and secured to both sides of the cylinder.

$P''$ is a tube or pipe surrounding the plate $N'$ and the opening which the plate covers and extending upward for a short distance into the tun A. The cylinder $P'$ is adapted to fit over the tube $P''$ and to form, practically, a continuation thereof when put in place thereover, as shown in Fig. 2, thus forming a tubular conduit for the contents of the tun, opening at a level higher than the level of the tube P″, which tube in turn forms an outlet when the controlling-valve plate N′ is raised for the contents of the tun opening thereinto at a level higher than do the pipes $N^2$.

R is a steam-pipe to supply steam to the cooker C.

The pipe T is designed to carry off steam from the kettle, and the pipe $K^{13}$ connects the tank $K^3$ with the storage-tank G and also serves to make part of the connection-passage from tank $K^3$ to the tun.

The use and operation of my invention are as follows: A quantity of malt is placed in the tun A and stirred and mixed until a suitable mash is formed. This mash is permitted to stand until it separates into a thin liquid and a thick mass. The cylinder P′ is now placed in position over the plate N′ and upon the false bottom and within the tun A, its upper extremity being in the thin liquid which has risen to the top. The valve $J^{10}$ is now operated so that the plate N′ retreats from the false bottom, whereupon the valve $J^{21}$ is closed and the valve $J^{20}$ opened, and the thin liquid will pass through the pipe $J^9$ into the heater B, thence through the pipe $J^8$ through the pump $J^4$ to the pipe J′ and pipe $J^5$ into the tun G, assuming that the valves $J^3$ and $J^7$ are closed and the valve $J^{15}$ open. This thin liquid in the tun G is now suitably cooled by a current of cooling-fluid passing from the pipe $G^2$ into the coil G′. I now remove the cylinder P′ and permit the thick mixture or mash to pass through the pipes P″ and $J^9$ into the heater B, where it remains, the valve in the pipe $J^8$ being closed. By the introduction of steam to the pipe L into the jacket of the heater B said mash may be raised to the boiling-point, where it should be cooked for a proper period. A quantity of raw or natural cereals, with from ten to fifteen per cent. of malt, is introduced into the cooker C, and steam is supplied through the pipe R, and the contents of the cooker C is stirred and cooked, and this process continues at a temperature somewhat above boiling-point and until the pressure in the cooker C has reached about forty-five pounds. The contents of the heater B is now forced by means of the pump $J^4$ through pipes J′ and $J^6$ into the tun A, the proper valve being suitably set. By operating the handle $F^2$ the slide-valve F′ is opened and the pressure in the cooker C forces its contents through the pipe $F^3$ into the tun A, where it is stirred and mixed with the contents of the heater B. It is understood of course in these last operations that the valve $J^{10}$ is closed. The contents of the tun A is now stirred and cooled by the introduction of water at the top or from tank H through the pipes $K^{20}$ and K and the pipes $N^2$ $N^2$, the valves being suitably set. Half of the contents of the tun G is now drawn into the tun A through the pipe O, the same having been raised to about the same temperature as the contents of the tun A, and the stirring is continued in the tun A. The remainder of the contents of the tun G is now raised to a higher temperature and introduced into the tun A. This last-mentioned portion of the contents of the tun G is not introduced into the tun A until the erythrodextrin reaction has ceased in the tun A. The wort will thus be formed in the tun A after a reasonable time, and is then drawn off through the false bottom and the pipes $N^2$ $N^2$ into the header $N^3$, through the pipe $N^4$ into the drum $N^6$, through the pipe $N^7$ into the heater or kettle B. When the strong wort has been sufficiently drawn off, the valve $N^5$ is closed and the header $N^3$ is connected with the tank $K^3$. This tank is then exhausted, so that the weak wort is sucked from the tun A into the tank $K^3$. This weak wort in the tank $K^3$ may be returned by means of steam-pressure applied through the pipe M′ to the tun G, or it may be exhausted from the tank $K^3$ into the vacuum-pan $K^5$, where it is concentrated or reduced. If desired, the thick mash from the tun A may be passed through the pipe $J^{11}$ into the cooker C and there treated, instead of being carried to the heater B. Should it be found necessary to heat the contents of the tun A, it may be done by introducing hot water from the tank J.

It will be seen that there are in effect three sets of pipes or conduits between the mash-tun A and the kettle B, each set opening into the mash-tun at a level different from the others. Thus the pipes $N^2$ open into the tun at the lowest level—that is, at the bottom thereof—and are connected through the parts $N^3$ $N^4$ $N^6$ $N^7$ with the kettle, forming one set of connections. The pipe or tube P″ opens into the mash-tun at a higher level than do the pipes $N^2$, and is connected with the kettle through the pipe $J^9$ and forms another set of connections, and the cylinder P′ opens into the mash-tun at a still higher level than does the pipe P″, and it, in connection with the pipes P′ and $J^9$, forms another set of connections with the kettle. It is true that two of these sets of pipe connections consist, throughout a portion of their course, of the same parts; but this is merely a matter of convenience to save the expense of additional piping, and is not a matter of necessity.

I claim—

1. In an apparatus for producing wort, the combination of a mash-tun, a kettle, means for heating the latter, the three sets of pipe connections, through any one of which the contents of the tun may be drawn into the kettle, one of the said connections opening into the mash-tun at the bottom thereof, another set at a somewhat higher level, and the third at a level considerably higher than the other two, and suitable valves for controlling the passage of the material through these different sets of connecting-pipes, substantially as set forth.

2. In an apparatus for producing wort, the combination of a mash-tun with a kettle and connecting-pipes between the two, one of said pipes opening into the tun at the bottom thereof and being connected with the kettle, another of said pipes leading from and opening into the tun at a point somewhat elevated above the bottom of such tun and being connected with the kettle, and the third pipe opening into the kettle at a point considerably higher than either of the other pipes and being connected with the kettle, so that the contents of the tun may pass to the kettle, being taken from the bottom of the tun, or somewhat above the bottom, or from a point considerably elevated above the bottom, said third pipe consisting of a short movable one within the tun and adapted to engage with the second-mentioned pipe connection above the bottom of the tun, so as with such second-mentioned pipe to constitute a third pipe opening into the tun at a higher elevation than either of the other two.

3. In an apparatus for producing wort, the combination of a mash-tun with an elevated storage-tun and a lower kettle to receive the thick mash from the mash-tun, connecting-pipes from the tun to the kettle and from the kettle to the storage-tun and from the storage-tun to the mash-tun a pump situated in the line of the said connecting-pipes, so that by gravity and the action of the pump the contents of the tun may be successively passed from the kettle and the storage-tun back to the mash-tun, and a tank to receive the weak wort from the mash-tun, and connections from the bottom of the mash-tun to such tank and from such tank to the storage-tun, whereby the weak wort after treatment in such tank may also be carried to the storage-tun.

4. In an apparatus for producing wort, the combination of a mash-tun with a cooker, the bottom of the cooker connected with the top of the tun and a steam-pipe opening into the cooker, whereby the contents thereof may be forced by steam-pressure over into the tun, and a pipe from the bottom of the tun to the top of the cooker, whereby a portion of the contents of the tun may be returned to the cooker.

5. In an apparatus for producing wort, the following elements arranged substantially as specified, to wit: a mash-tun, a weak-wort tank connected therewith by a pipe leading from the bottom of the mash-tun to such tank, said tank provided with an exhaust apparatus, by means of which the weak-wort contents of the tun may be exhausted into the tank, and a kettle connected with the tun from a point within and somewhat above the bottom of such tun and adapted to receive the strong wort from the tun.

6. In an apparatus for producing wort, the following elements arranged substantially as described, to wit: a mash-tun, a weak-wort tank connected therewith by a pipe leading from the bottom of the mash-tun to such tank, said tank provided with an exhaust apparatus, by means of which the weak-wort contents of the tun may be exhausted into the tank, and a kettle connected with the tun and adapted to receive the strong wort from the tun, said tun provided with a false perforated bottom, and the pipe leading to the kettle opening into the tun below such bottom, while the pipe leading to the tank also opens into the tun below such bottom, and connecting-pipes leading from both tun and tank to the storage-tun.

7. In an apparatus for producing wort, the combination of a mash-tun, a concentrating apparatus or vacuum-pan, a tank to receive the weak wort, with a pipe making a connection leading to the storage-tun and a pipe connection leading to the concentrating apparatus or vacuum-pan, said tank provided with an exhaust device to exhaust a portion of the contents of the mashing-tun into the tank, and means for forcing the wort from the said tank to the storage-tun.

CARL RACH.

Witnesses:
CELESTE P. CHAPMAN,
JEAN ELLIOTT.